June 18, 1929.  H. SCHARNAGEL  1,717,895

REFRIGERATING APPARATUS

Filed April 30, 1925   6 Sheets-Sheet 1

Inventor,
Herman Scharnagel
By M. H. Laughridge Atty.

June 18, 1929.   H. SCHARNAGEL   1,717,895
REFRIGERATING APPARATUS
Filed April 30, 1925   6 Sheets-Sheet 2
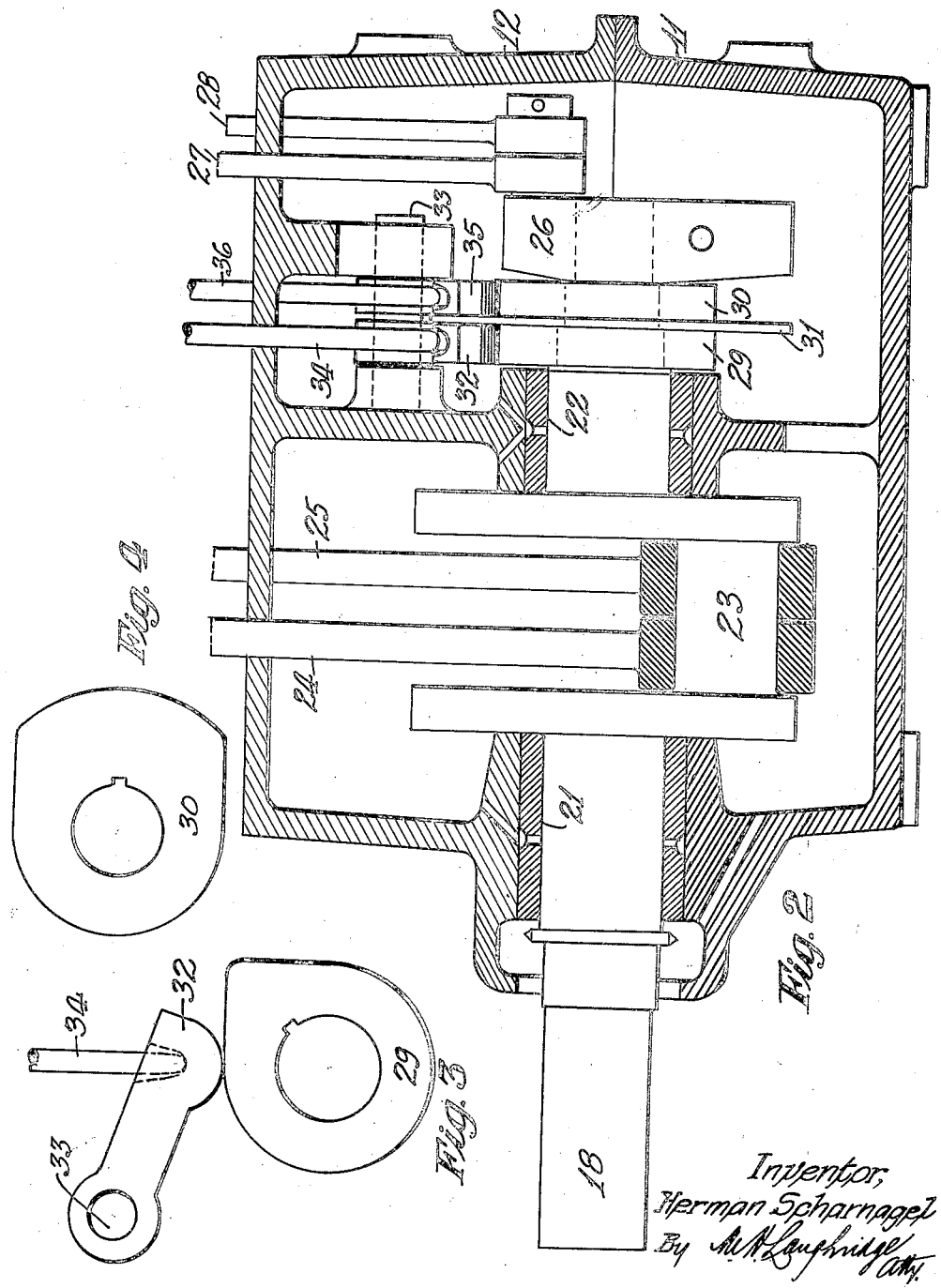

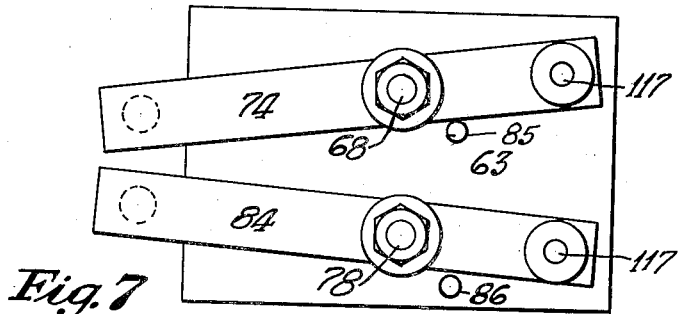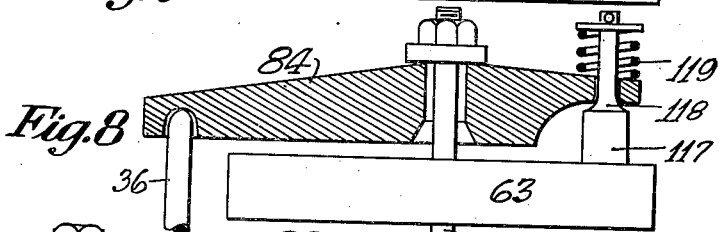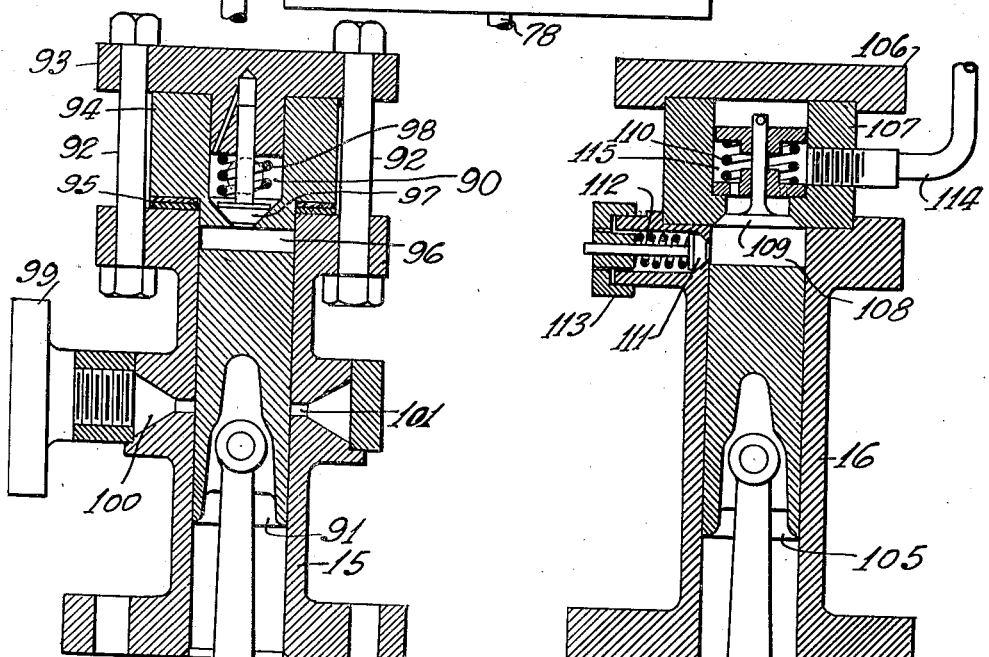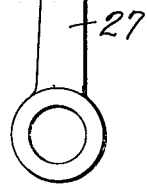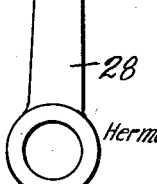

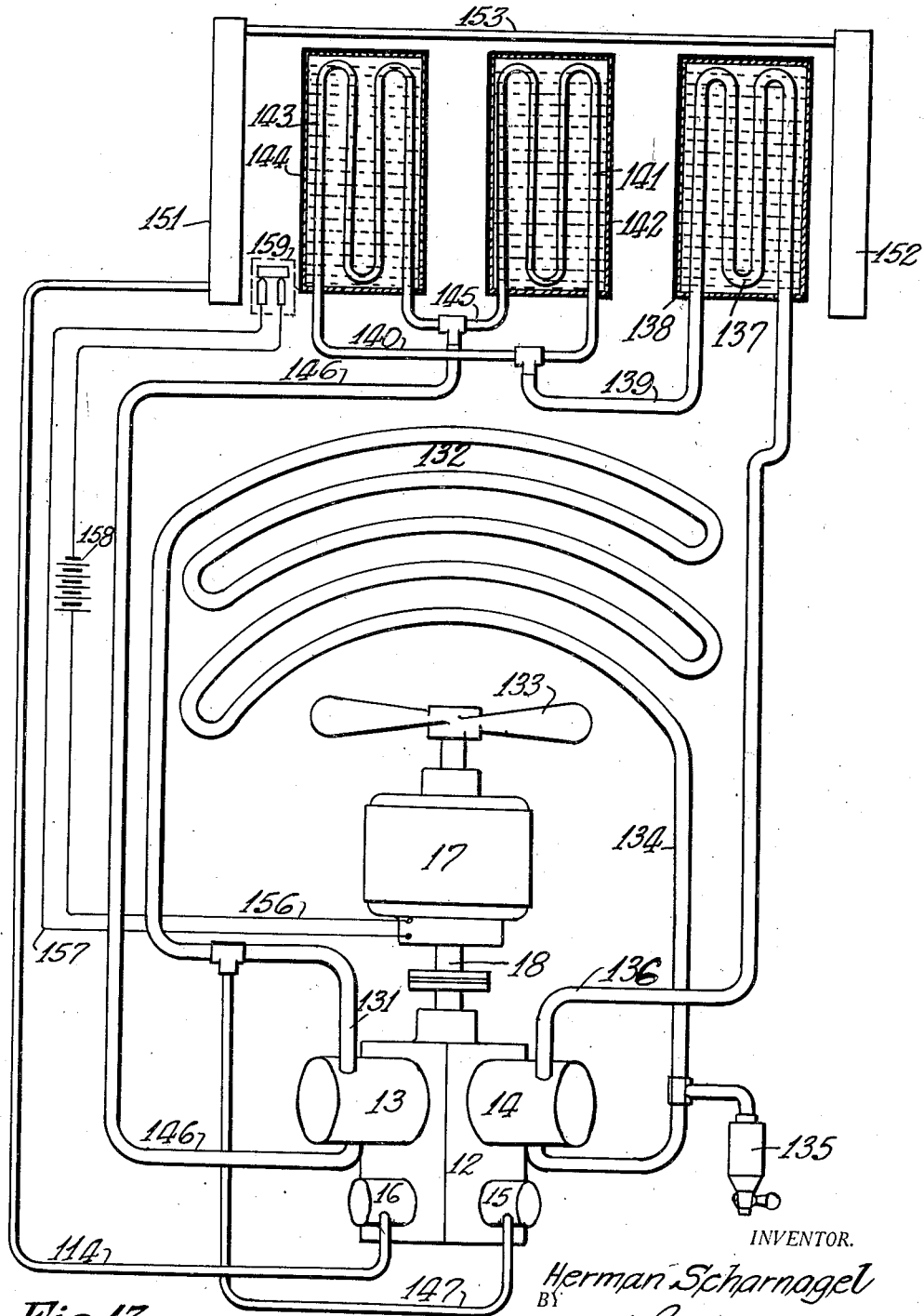

Patented June 18, 1929.

1,717,895

UNITED STATES PATENT OFFICE.

HERMAN SCHARNAGEL, OF TOMPKINSVILLE, NEW YORK, ASSIGNOR TO HARRY W. DYER, OF NEW YORK, N. Y.

REFRIGERATING APPARATUS.

Application filed April 30, 1925. Serial No. 27,071.

Figure 11:
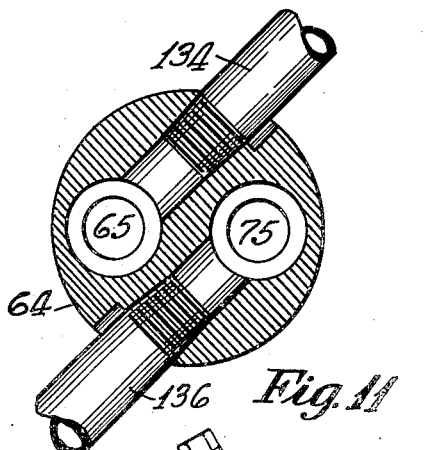
Figure 12:
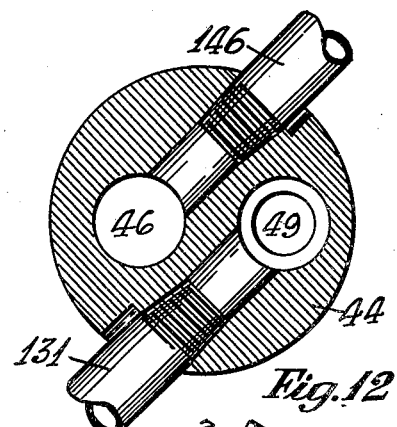
Figure 1:
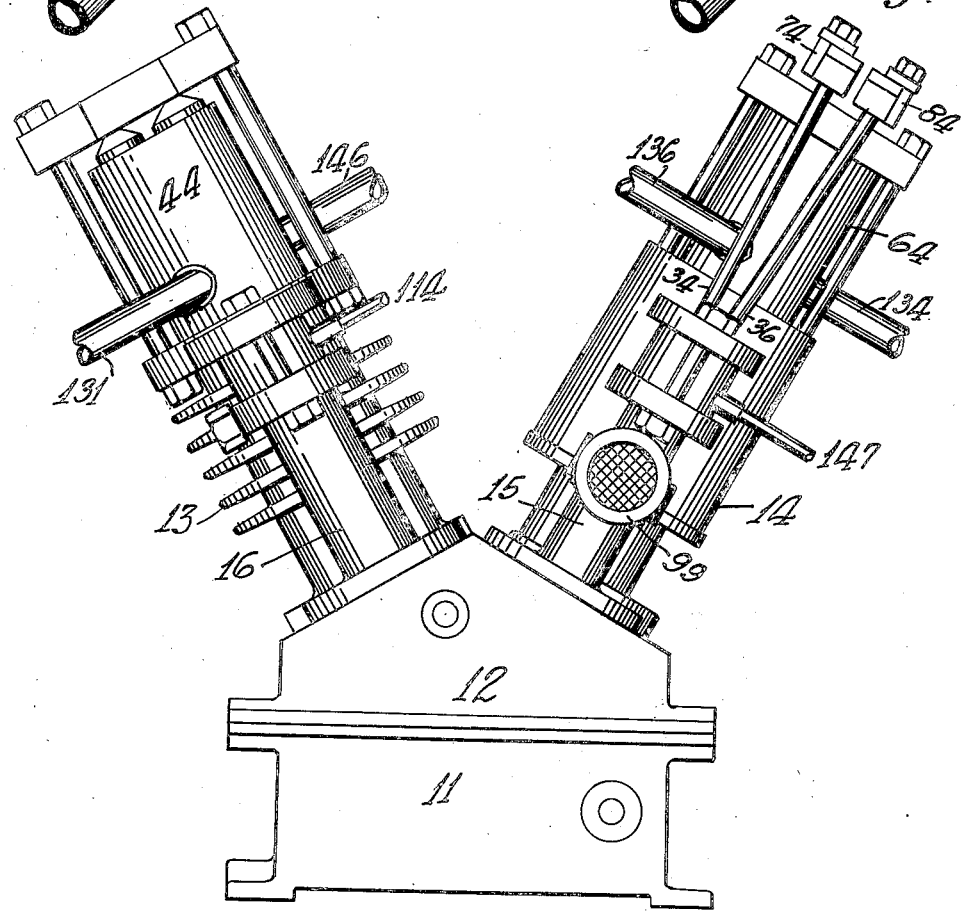
Figure 5:
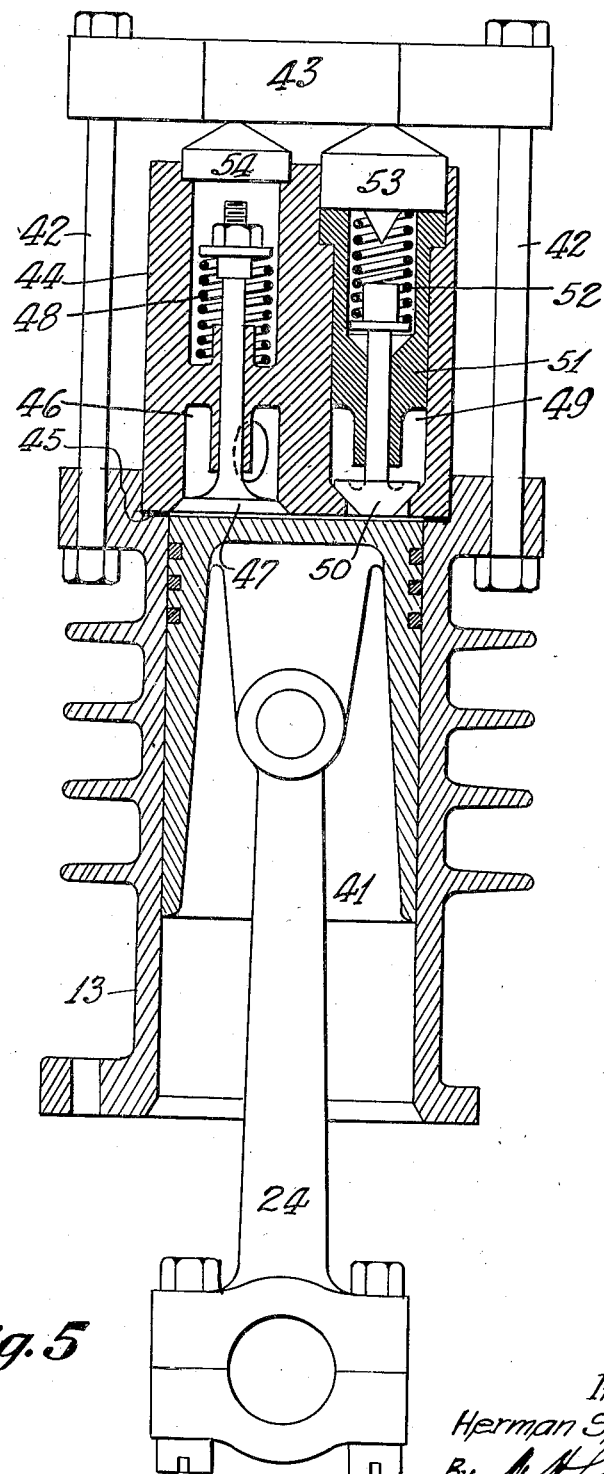
Figure 6:
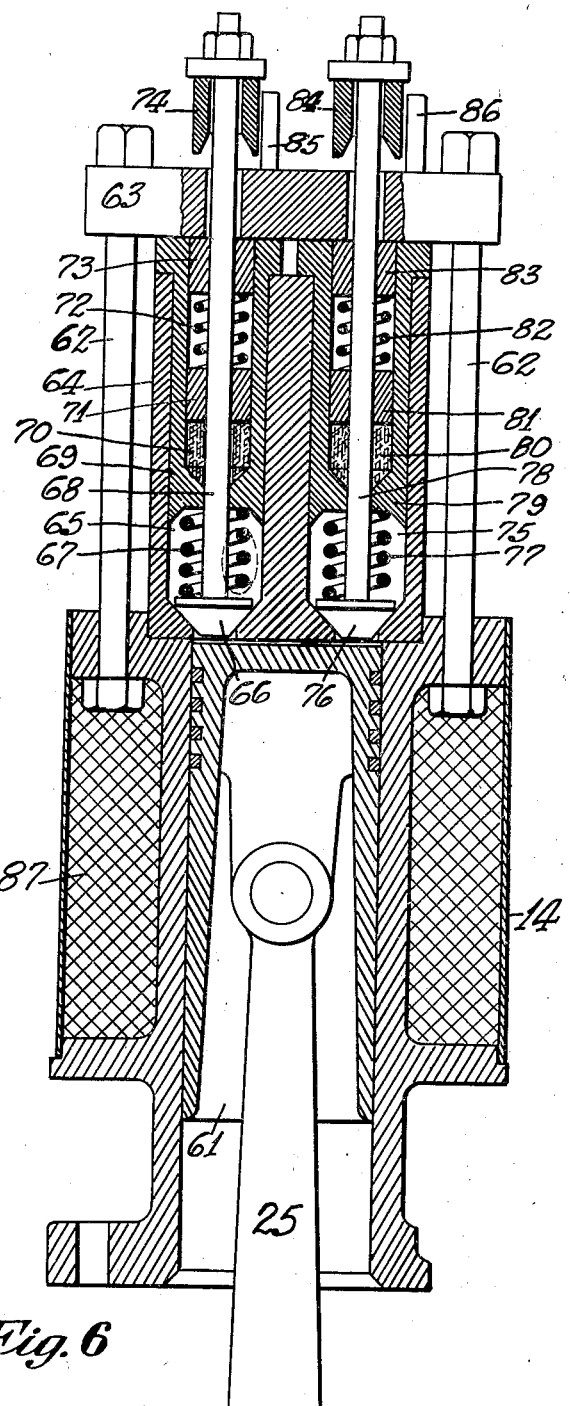

This invention relates to refrigerating apparatus particularly of the household type and has for an object to provide a self contained refrigerator in a small unit, a refrigerator that does not require special attention in use beyond the care of the operating mechanism, a refrigerator that will automatically bring itself to and maintain itself in normal running condition, a refrigerating apparatus that uses a gas such as air as the refrigerating medium operating in a closed circuit system; the invention further resides in the details of construction and the arrangement of the apparatus as more fully described in the following specification and shown in the accompanying drawings, in which, Fig. 1, is a side elevation of the operating mechanism on a reduced scale, Fig. 2 is a sectional elevation of the base of the operating mechanism, Fig. 3 shows one of the cams on the main shaft for operating one of the valves of the expander, Fig. 4 shows another cam on the main shaft for operating another of the valves of the expander engine, Fig. 5 is a sectional elevation of the compressor, Fig. 6 is a sectional elevation of the expander engine, Fig. 7 is a plan view of the top plate of the expander engine showing the valve lifting levers, Fig. 8 is a side elevation corresponding to Fig. 7 showing one of the valve lifting levers in longitudinal section, Fig. 9 is a sectional elevation of the make-up pump, Fig. 10 is a sectional elevation of the vacuum pump, Fig. 11 is a cross-section of the valve head of the expander engine on the line of the valve chambers showing the pipe connections, Fig. 12 is a cross-section of the valve head of the compressor on the line of the valve chambers showing the pipe connections, and Fig. 13 is a piping arrangement for a complete refrigerating system using this apparatus.

The present invention is designed to use air as the refrigerating medium which is compressed by a motor driven compressor then cooled in a manifold by an air circulating system, then expanded in an expansion engine to a comparatively low pressure with a corresponding reduction in temperature, then led through refrigerating coils in the cooling chamber and returned to the compressor in a closed circuit.

Referring to the drawings, 11 is the base of the mechanism and 12 is the top which is V shaped to support the compressor 13 and the expander 14, also the make-up pump 15 and the vacuum pump 16. These devices are operated by the motor 17, Fig. 13, through the shaft 18 as indicated in Fig. 2. The shaft 18 runs on the bearings 21 and 22 and is developed into the crank 23 to which the connecting rods 24 and 25 connect in the usual manner. Another crank 26 with a comparatively short throw on the end of shaft 18 operates the connecting rods 27 and 28.

Cams 29 and 30, Figs. 3 and 4 are mounted on shaft 18 as shown and are separated by a disc 31. Riding on cam 29 is the tappet 32 which is pivoted on shaft 33 and is provided with a pocket to receive the end of rod 34. Similarly, riding on cam 30 is the tappet 35 provided with a pocket to receive the end of rod 36.

The compressor cylinder 13, Fig. 5 is operated by rod 24 connecting to piston 41. The valve head 44 is clamped on top of this cylinder by bolts 42 and cross bar 43. A gasket 45 may be used between the valve head and cylinder to insure an air tight connection.

The valve chamber 46 is controlled by the valve 47 which opens downwardly and is held on its seat by the spring 48. This valve is opened by the suction created by the piston 41 and by the pressure in chamber 46. The valve chamber 49 is controlled by the valve 50 which opens upwardly and is normally held on its seat by spring 52. This valve is opened by the pressure generated by the upward stroke of the piston. Valve 50 works on sleeve 51 which is held in place by the cap 53 and the cap 54 closes the top opening of valve 47.

The expander cylinder, Fig. 6 is operated by connecting rod 25 connecting to piston 61 in the cylinder 14 which is provided with a heat insulating jacket 87. The valve head 64 is clamped on top of the cylinder by the bolts 62 and the cross plate 63 as shown.

The valve chamber 65 is controlled by valve 66 which opens upwardly and is normally held on its seat by spring 67. The stem 68 of this valve passes through the spider 69 which contains the packing gland 70 held in effective engagement with the valve stem by spring 72 between plugs 71 and 73. This valve is opened by the lifting lever 74 on top of plate 63 as hereafter described.

The valve chamber 75 is controlled by valve 76 which opens upwardly and is normally held on its seat by spring 77. The stem 78 of this valve passes through the valve spider 79 which contains the packing gland 80 held in effective engagement with the valve stem by spring 82 pressing downward on collar 81 and against collar 83. This valve is opened by the lifting lever 84 on top of plate 63 as hereafter described. Pins 85 and 86 are provided on top of plate 63 to support the lifting levers 74 and 84 which operate on an inclined position.

The operation of the lifting levers will be understood from Figs. 7 and 8. A post 117 with a rounded base 118 is provided for a bearing for the end of each lifting lever which is held in place on the post by spring 119 as shown in section in Fig. 8. The valve stem 68 passes through the lifting lever 74 and the valve stem 78 passes through the lifting lever 84. These stems bear upon the levers through a nut and washer as shown. When rod 34, Fig. 1 is raised by the cam, lever 74 is raised and valve 66 is opened. When rod 36 is raised by the cam, lever 84 is raised and valve 76 is opened.

The make-up pump is shown in Fig. 9 and comprises the cylinder 15 having the piston 91 operated by the connecting rod 27. The valve chamber 94 is clamped on top of the cylinder by bolts 92 and the top cover 93. The valve chamber 90 is controlled by the valve 97 which opens upwards and is normally seated by spring 98. Air is taken in through the screen 99 to the annular chamber 100 and by ports 101 enters the cylinder above the piston 91 where it is compressed at the end of the cylinder in the space 96. The pressure at 96 is regulated by the size of this chamber which is varied as desired by the thickness of the washers 95. Chamber 90 is connected with the pressure side of the system which tends to hold valve 97 seated. When the pressure of the system is below normal from leakage or other causes it is apparent that the pressure in 96 may exceed the pressure in chamber 90 thereby opening valve 97 and making up the pressure in the system from the excess pressure in 96. As soon as these pressures balance, or the pressure in 90 exceeds the pressure in 96 valve 97 will not open and the compressed air at 96 will expand again as the piston moves downwards. This make-up pump thus automatically maintains the pressure in a closed circulating system.

The vacuum pump as indicated in Fig. 10 is used to maintain a vacuum where vacuum is used as a heat insulator. This comprises the cylinder 16 with the piston 105 operated by the connecting rod 28. On the head of the cylinder the valve chamber 107 is clamped by cover 106. The valve 109 which opens inwardly controls chamber 115 which is connected with pipe 114. Spring 110 normally holds valve 109 on its seat. Valve 111 opening outwardly is connected with chamber 108 at the upper end of the cylinder and is held normally seated by spring 112. It will be observed that as the piston moves downwards a vacuum is created in the cylinder which, if greater than the vacuum in chamber 115 will open valve 109 thereby improving the vacuum connected with the vacuum pipe 114. On the return of the piston valve 109 is closed and the pressure in chamber 108 is released through valve 111 and escapes by the stem of this valve where it passes through cover 113.

The operation of the system will be understood from a consideration of the diagram in Fig. 13. Air under pressure from the compressor 13 is delivered to pipe 131 which connects with chamber 49 as shown in the section drawing in Fig. 12. Pipe 131 connects with the manifold 132 which is cooled by the fan 133. The return from this manifold connects by pipe 134 with the expander cylinder 14 connecting to valve chamber 65 as indicated in Fig. 11. A trap 135 may be provided at a low point in this coil to drain off condensed moisture. It should be noted, however, that as this is a closed circuit system and as moisture may be filtered from the air by screen 99 moisture is readily removed from the system and cannot accumulate therein.

From the expander cylinder 14 air is conducted by pipe 136 which connects with valve chamber 75 to the refrigerating coils. These comprise the coil 137 in tank 138 and the coil 141 in tank 142 and coil 143 in tank 144. These tanks may be filled with brine, water, alcohol or other fluid that is readily cooled by the cold air in the refrigerating system. It will be noted that coil 137 connects by pipe 139 and by pipe 140 with coils 141 and 143 in multiple and from these coils a return is made by pipe 145 and pipe 146 to valve chamber 46 of the compressor 13, thus the cycle of operation is completed and the air is returned to be used over again in the system. Since the coil 137 is connected in series and has all the refrigerating medium circulating through it and the coils 141 and 143 are connected in multiple and each receive only half of the refrigeration medium, it is apparent that tank 138 will be cooled to a greater degree than tanks 142 or 144 and by suitably locating these tanks a graduated cooling effect is obtained.

The make-up pump 15 connects by pipe 147 with the pressure pipe 131 of the manifold 132 and continually operates to make-up for any leakage in the system. The vacuum pump 16 connects by pipe 114 with the vacuum tank 151 and by pipe 153 with the vacuum tank 152. These vacuum tanks form the outer walls of the cooling chamber and by reason of the vacuum which is constantly maintained are effective heat insulators. According to usual practice, the motor 17 is controlled by wires 156 and 157 and battery 158. The circuit of the motor being established at predetermined temperatures by the thermostatic device 159 located in the cooling chamber.

Considering a concrete application of this invention, suppose the make-up pump delivers a pressure of 60 lbs. to the valve chamber 90 then the compressor will be working against a pressure of 60 lbs. in valve chamber 49 and delivering air in excess of this pressure for the circulating system. This air is heated by the compression and is cooled by passing through the manifold and in the cooled state is delivered to valve chamber 65 of the expander but under a pressure of substantially 60 lbs. Valve 66 is momentarily opened by cam 29 as the piston is on the downward stroke so that this air on expanding drives the piston down and is reduced in pressure to approximately 20 lbs., thereby creating a very low temperature in cylinder 14. On the return stroke of piston 61 valve 76 is opened by cam 30 and remains open during the upward stroke. This drives the expanded air into valve chamber 75 from which it is taken to the refrigerating coils where it ultimately acquires heat from the cooling chamber and thereby increases in pressure until it is delivered to the intake valve 47 of the compressor to be used again in another cycle of operations. It will be noted that in the expansion cylinder, valve 66 is unseated against a pressure of approximately 60 lbs. while valve 76 is unseated against a pressure of only 20 lbs. Valve 66 is mechanically opened on the down stroke of the piston and valve 76 is mechanically opened on the up stroke of the piston, owing to the difference in pressure on the head of valve 66 in excess of the pressure in cylinder 14 on the up stroke there is no possibility of valve 66 opening automatically on the up stroke.

It should be noted that this entire system is self operative and self restoring after a long interval of rest. For instance, if the vacuum should become low in the vacuum tanks or if the pressure in the system should be reduced by a period of idleness, these conditions will be self restoring by the continuous operation of the motor until normal operating conditions are restored.

Having thus described my invention, I claim:

1. Refrigerating apparatus comprising in combination, a refrigerating element, an expander, a manifold coil, a pump for circulating medium thru said coil and said element, a motor for operating said pump, a base, said pump and said motor supported on said base, a cooling chamber housing said refrigerating element, said cooling chamber having walls heat insulated by a vacuum tank, a vacuum pump connected to said vacuum tank and detachably mounted on said base and operated by said motor and a thermostat in said cooling chamber for controlling the operation of said motor.

2. In a refrigerator, the combination, a refrigerator coil and a manifold coil forming a closed circuit system, a mechanism comprising a motor operating a shaft, a compressor, an expander, a make-up pump and a vacuum pump all operatively connected with said shaft, said compressor and expander maintaining a circulation in said system and said make-up pump maintaining the pressure in said system, a cooling chamber in which said refrigerating coil is located, said chamber having walls insulated by vacuum tanks and a thermostat in said chamber controlling the operation of said motor and said vacuum pump connected with said vacuum tanks.

Signed at New York in the county of New York and State of New York, this 17th day of April, A. D. 1925.

HERMAN SCHARNAGEL.